US012306146B2

(12) United States Patent
Shukla

(10) Patent No.: US 12,306,146 B2
(45) Date of Patent: May 20, 2025

(54) VALVE SWITCHING SYSTEM FOR SELECTIVELY INTERCONNECTING COMPONENTS OF A BIOPROCESS INSTALLATION

(71) Applicant: Sartorius Stedim North America Inc., Bohemia, NY (US)

(72) Inventor: Dinesh Shukla, Bolton, MA (US)

(73) Assignee: Sartorius Stedim North America Inc., Bohemia, NY (US)

(*) Notice: Subject to any disclaimer, the term of this patent is extended or adjusted under 35 U.S.C. 154(b) by 349 days.

(21) Appl. No.: 17/896,645

(22) Filed: Aug. 26, 2022

(65) Prior Publication Data

US 2024/0068996 A1    Feb. 29, 2024

(51) Int. Cl.
*G01N 30/46* (2006.01)
*B01D 15/18* (2006.01)

(52) U.S. Cl.
CPC ....... *G01N 30/468* (2013.01); *B01D 15/1842* (2013.01); *B01D 15/1885* (2013.01); *G01N 30/466* (2013.01)

(58) Field of Classification Search
CPC ............ B01D 15/1842; B01D 15/1864; B01D 15/1821; F16K 11/22; F16K 31/1268; F16K 99/0015; F16K 99/0028; F16K 99/0059; G01N 30/46; G01N 2030/328; G01N 30/38

See application file for complete search history.

(56) References Cited

U.S. PATENT DOCUMENTS

| 7,846,335 B2 | 12/2010 | Bisschops et al. |
| 2008/0053543 A1 | 3/2008 | Baier et al. |
| 2018/0078937 A1* | 3/2018 | Rensch ............. B01L 3/502715 |

FOREIGN PATENT DOCUMENTS

EP    1775001    4/2007

OTHER PUBLICATIONS

"International Search Report and Written Opinion," for PCT Application No. PCT/US2023/030451 mailed Nov. 7, 2023 (12 pages).

* cited by examiner

*Primary Examiner* — Waqaas Ali
(74) *Attorney, Agent, or Firm* — Pauly, DeVries Smith & Deffner LLC

(57) ABSTRACT

Various embodiments are directed to a valve switching system for selectively interconnecting components of a bioprocess installation, comprising a valve switching cassette and an actuator block. It is proposed, that the valve switching cassette comprises a perforated backer plate securing a valve membrane structure to a cassette manifold, that the actuator block comprises a drive membrane structure with at least one drive membrane and a perforated backer plate securing the drive membrane structure to an actuator block body, wherein for selectively switching valve units, an actuator of the actuator block may urge the drive membrane structure through aligned perforation holes of both backer plates into engagement with the valve membrane structure.

16 Claims, 4 Drawing Sheets

VALVE SWITCHING SYSTEM FOR SELECTIVELY INTERCONNECTING COMPONENTS OF A BIOPROCESS INSTALLATION

FIELD OF THE TECHNOLOGY

Various embodiments relate to the design of a valve switching system for selectively interconnecting components of a bioprocess installation, a method for manufacturing a valve switching system, a bioprocess installation with a valve switching system, a method for operating a valve switching system, and the use of a valve switching system.

BACKGROUND

The proposed valve switching system may be applied in various fields of biotechnology and for different kinds of bioprocesses. For biopharmaceutical processes, cost-efficiency and process reliability are especially relevant. Cost-efficiency is not only related to material costs, but also manufacturing costs. Further, cost-efficiency is also important considering for example the working hours required for equipment installation and the costs for maintenance as well as operation of the bioprocess itself. Process reliability is important in view of the utilized materials, the installation procedure, as well as the correct operation of the bioprocess. Especially in an environment that is highly regulated by authorities (e.g., by the Food and Drug Administration (FDA)), process reliability is crucial to ensure product safety.

For the valve switching system as part of the SMB process related to biopharmaceutical production, it is also the key to ensure a simple installation of the valve switching system. Thus, a disposable and compact design of the individual valves and connectors is essential. A valve switching cassette as part of a valve switching system, designed as a disposable item and with a compact design of the valve switching cassette, is disclosed in EP 1 775 001 A1. In the above noted known valve switching system, which is the starting point for various embodiments, ports and fluid lines of the valve switching cassette are organized in a compact cassette manifold. The fluid lines within the cassette manifold are selectively connected by an array of switchable valve units that are designed as membrane valve units to control the fluid flow within the cassette manifold. The valve units each comprise a valve seat, wherein a respective valve membrane selectively engages the valve seat or disengages the valve seat as to switch the valve units. The valve membrane may be actuated by an actuator. The actuator acts on the valve membrane to switch the valve unit. The actuator is part of an actuator block that is part of the valve switching system. Several actuators might be arranged on an actuator block body.

For actuation of the valve membrane, liquid or gas pressure may be used. To achieve this, the actuator comprises an actuation outlet that leads into an actuator block pocket. The actuator block pocket refers to the part of the actuator block body that the actuation outlet leads into and that has contact points to the valve membrane. These contact points need to be sealed gas- or liquid-tightly as gas or liquid is guided through the actuation outlet towards the valve membrane. To ensure a reliable actuation of the valve membrane, and, consequently, the correct functioning of the valve unit, the contact points between the actuator block and the valve membrane need to be sealed gas- or liquid-tightly.

In the known system, high forces are required to establish a leak-free connection at the contact points between the actuator block pocket and the valve membrane, which often lead to challenges in view of easy installation. Additionally, maintaining the required high pressure during installation and subsequent operation of the valve switching system is costly. Further, applying high pressure to plastic materials, e.g., the cassette manifold, increases the likelihood of stress cracking, and, thus, the damaging of the valve switching system. An increased likelihood of stress cracking also reduces the reliability during operation. Additionally, the valve membrane might require a certain thickness to withstand the applied forces, which in turn may increase the fluid pressure required to actuate the valve unit.

SUMMARY

It is therefore an objective of various embodiments to provide means that simplify the installation and assembly of the valve switching system while simultaneously increasing its reliable operation and cost-efficiency.

The above-noted problem is solved by a valve switching system according to various embodiments.

The term "bioprocess" presently represents any kind of biotechnological process, in particular biopharmaceutical processes. The operation of a chromatography arrangement with multiple chromatography columns, that are connected to a valve switching system for performing a simulated moving bed (SMB) chromatography, may be part of such a bioprocess.

A premise for various embodiments is the valve switching system comprising a valve switching cassette with a cassette manifold with ports and fluid lines and an array of switchable valve units to selectively interconnect the fluid lines. Switching of the valve units is realized by an actuator block as part of the valve switching system.

The general concept underlying various embodiments now is based on the valve switching system using two backer plates with perforations and a drive membrane structure. According to some embodiments, it has been found that the installation of the valve switching system is simplified and that the pressurization forces required for gas- and/or liquid-tight operation on the side of the valve switching cassette might well be significantly reduced by using two backer plates and a drive membrane structure.

The general idea is to realize the valve switching cassette and the actuator block as separate units, that may be separately pre-assembled, wherein those two units add up to the proposed valve switching system by joining their backer plates face to face.

In detail it is proposed that the valve switching cassette comprises a perforated backer plate that secures a valve membrane structure to the cassette manifold. Further, the actuator block comprises a drive membrane structure and a perforated backer plate, whereby the perforated backer plate secures the drive membrane structure to the actuator block body. Both backer plates comprise a pattern of perforation holes. The perforation holes of both backer plates are at least partly aligned to each other, such that for selectively switching the valve units, the drive membrane structure may be urged by an actuator of the actuator block through any one of the perforation holes of the backer plates. This way, the drive membrane structure engages with the valve membrane structure to selectively close the respective valve unit.

The advantage here is that the valve switching cassette and the actuator block can be pre-assembled, which simplifies the installation of the valve switching system. Further, by including a drive membrane structure, the thickness of the valve membrane structure can be reduced considerably. This way, the reliable actuation of the valve membrane structure to switch the valve units is ensured while the costs for the valve membrane structure are reduced. Further, the sensitivity of the actuation may be increased as well and the fluid pressure required to actuate the valve membrane may be reduced, which further contributes to increase the reliability and sensitivity of the process.

Additionally, due to the decoupling from the actuator block, less pressure is to be exerted on the cassette manifold. Consequently, less material can be used for the cassette manifold. Additionally, the material costs are decreased by increasing the durability of the materials. This also enhances the process reliability. Further, it is now possible to decrease the time required for equipment installation by ensuring a compact design and enabling the preassembly of the valve switching cassette and the actuator block.

According to various embodiments, the drive membrane protrudes through aligned perforation holes in both backer plates to switch the respective valve unit(s). Here, the advantage is that a gap between the actuator block and the valve switching cassette can be realized. This adds flexibility to the design. Further, the protrusion of the drive membrane is directed towards the valve membrane in a defined way.

According to various embodiments, the valve switching cassette and the actuator block are joined together via the respective backer plates, in particular via the respective flat face of the backer plates. This facilitates the easy installation and set-up of the valve switching system and protects the membranes during installation.

According to various embodiments, the perforation holes of the backer plates may be aligned to the valve seats of the valve units. This enables an easy solution for a predefined protrusion of the membrane structures. This way, mechanical wear of the membrane structures is reduced and the reliable switching of the valve units is ensured.

Various embodiments are directed to the materials used for the valve membrane structure and/or the drive membrane structure. The advantage here is, that different materials with different properties can be used for the membrane structures, which adds flexibility for operation. Further, both membrane structures can be selected to suit their respective function in the best way.

Various embodiments are directed to the structure of the valve membrane and/or the drive membrane. Each of the membrane structures might comprise stripes. The utilization of stripes enhances proper positioning of the membranes. This way, the process reliability is increased as a misplacement of the membrane structures is avoided. Further, the amount of membrane material required is reduced, which also reduces the overall costs.

Various embodiments are directed to the fastening of the membrane structures. By using the backer plates to secure the membrane structures, the backer plates serve a double function, because they enable the preassembly of the different parts and establish the leak-free connections required. This double function simplifies the overall design of the valve switching system.

According to various embodiments, the actuator of the actuator block comprises an actuation outlet. This way, the evenly actuation of the drive membrane structure is achieved. Further, the actuator block may be of simple construction and reusable as it is out of contact from any process fluids distributed within the cassette manifold.

Various embodiments are directed to a method for manufacturing the valve switching system. By joining the valve switching cassette and the actuator block via the respective backer plates, manufacturing of the valve switching system is simplified since both parts can be preassembled. This simplifies the installation as the membranes are already assembled and protected from damage.

Various embodiments are directed to the bioprocess installation as such. Reference may be made to all explanations given with regard to the proposed valve switching system.

According to various embodiments, the valve switching system is used as a part of a bioprocess installation for performing simulated moving bed (SMB) chromatography. Here the advantage is a compact arrangement of the liquid path network to control the fluid flow.

In various embodiments, a method for operating the valve switching system is provided. Again, reference may be made to all explanations given with regard to the proposed valve switching system.

In various embodiments, the use of the proposed valve switching system is provided as such for switching the columns of the bioprocess installation. All explanations given regarding the proposed valve switching system and the proposed bioprocess installation are fully applicable.

Various embodiments provide a valve switching system for selectively interconnecting components of a bioprocess installation, comprising a valve switching cassette and an actuator block, wherein the valve switching cassette comprises a cassette manifold with at least one fluid flow system of ports and fluid lines, which includes primary ports, communicating with primary fluid lines, and secondary ports, communicating with secondary fluid lines, wherein the valve switching cassette comprises an array of switchable valve units for selectively interconnecting the primary fluid lines with the secondary fluid lines via transfer fluid lines, wherein the valve units each comprise a valve seat, wherein the valve switching cassette comprises a valve membrane structure with at least one valve membrane, that may selectively engage the valve seats as to switch the valve units, wherein the actuator block comprises an actuator block body with an actuator for each valve unit, wherein that the valve switching cassette comprises a perforated backer plate securing the valve membrane structure to the cassette manifold, that the actuator block comprises a drive membrane structure with at least one drive membrane and a perforated backer plate securing the drive membrane structure to the actuator block body, wherein the perforations of both backer plates each include a pattern of perforation holes, wherein the perforations of both backer plates are at least partly aligned to each other, such that for selectively switching the valve units, an actuator of the actuator block may urge the drive membrane structure through aligned perforation holes of both backer plates into engagement with the valve membrane structure.

In some embodiments, the drive membrane, if urged by an actuator of the actuator block, protrudes through the respective perforation hole in the backer plate of the actuator block and through the aligned perforation hole in the backer plate of the valve switching cassette.

In some embodiments, the valve switching cassette and the actuator block are joined together via the respective backer plates.

In some embodiments, at least part of the perforation holes of the backer plate of the valve switching cassette and/or at least part of the perforation holes of the backer plate of the actuator block are aligned to the valve seats of the valve units.

In some embodiments, at least one valve membrane of the valve membrane structure is composed of fluorocarbon-based fluoroelastomer materials.

In some embodiments, at least one drive membrane of the drive membrane structure is composed of a soft plastic material.

In some embodiments, the valve membrane structure and/or the drive membrane structure comprise(s) membrane stripes.

In some embodiments, the valve membrane is secured to the cassette manifold by the respective backer plate, which backer plate provides a detachable, gas- and/or liquid-tight connection between the valve membrane and the cassette manifold.

In some embodiments, the drive membrane is secured to the actuator block body by the respective backer plate, which backer plate provides a detachable, gas- and/or liquid-tight connection between the drive membrane and the actuator block.

In some embodiments, the actuator of the actuator block comprises at least one actuation outlet, such as a gas pressure outlet or a liquid pressure outlet.

Various embodiments provide a method for manufacturing a valve switching system as described herein wherein the valve switching cassette and the actuator block are being joined together via the respective backer plates.

Various embodiments provide a bioprocess installation, comprising a valve switching system as described herein.

In some embodiments, the bioprocess installation comprises a chromatography arrangement with multiple chromatography columns, that are connected to a valve switching system as described herein for performing a simulated bed chromatography process.

In some embodiments, the valve units are being selectively switched by the drive membrane structure being urged by the actuator block through aligned perforation holes of both backer plates, thereby engaging the valve membrane structure to switch the respective valve unit.

Various embodiments provide a use of the valve switching system for switching the chromatography columns of the bioprocess installation as described herein.

BRIEF DESCRIPTION OF THE DRAWINGS

In the following, various embodiments are explained with respect to the drawings. The drawings show FIG. 1 a schematic overview of the proposed valve switching system as part of a proposed bioprocess installation, FIG. 2 an exploded view of the proposed valve switching system, FIG. 3 the working principle of the valve units of the valve switching cassette as part of the valve switching system, FIG. 4 a part of the bioprocess installation according to FIG. 1 in an exemplary mode of operation.

DETAILED DESCRIPTION

Figure 1:
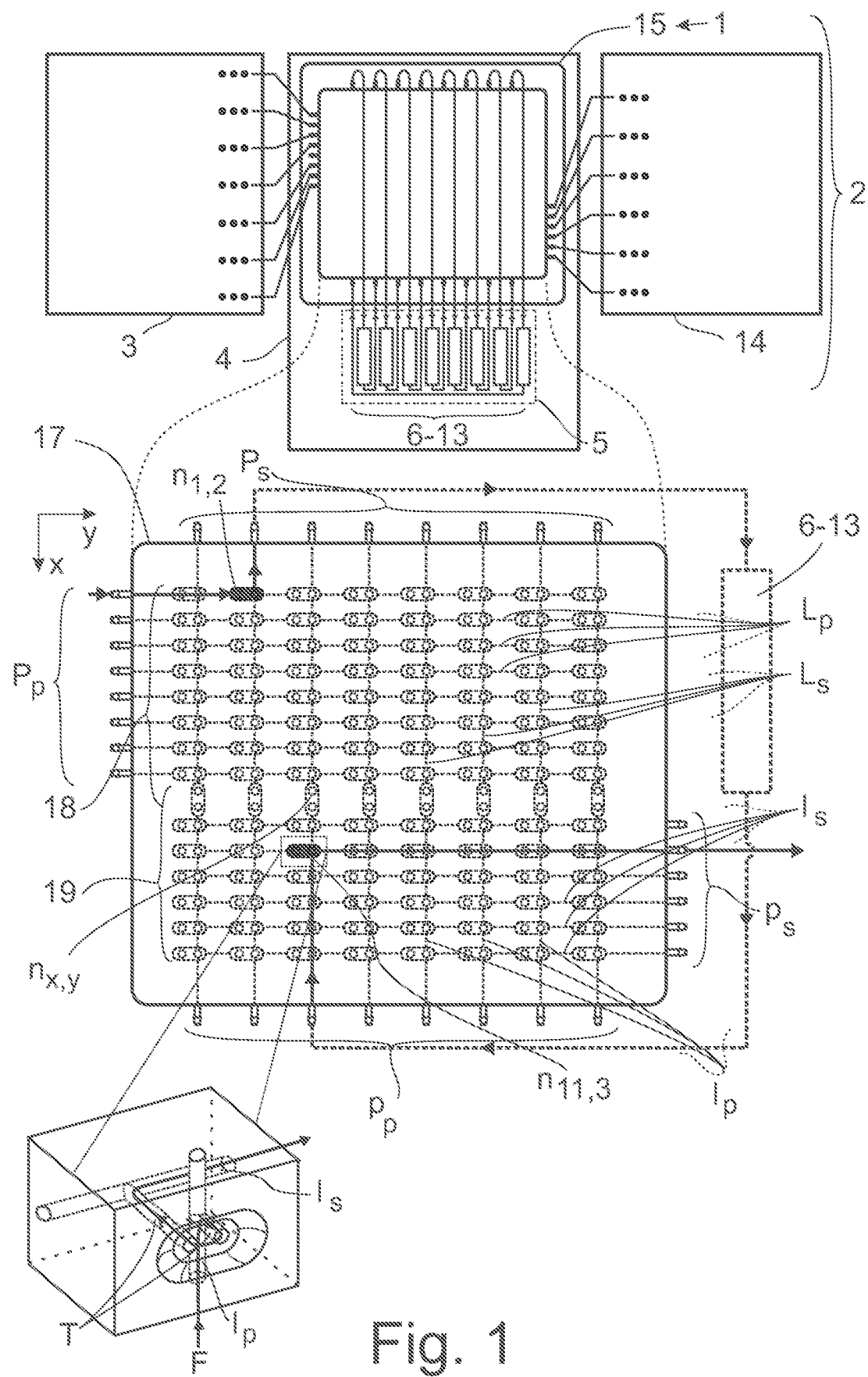

As shown in FIG. 1, the proposed valve switching system 1 here can be used for selectively interconnecting components of a bioprocess installation 2. The expression "interconnecting" is to be understood in the sense of a fluid connection.

In particular, FIG. 1 depicts the consecutive steps carried out for recovery and purification of a desired product, such as a monoclonal antibody, as part of the downstream process within a bioprocess. In the first steps of the downstream process, the product is isolated in an isolation unit 3. Assuming that the product is located in the supernatant of the fermentation broth, centrifugation may be carried out to separate the product from the cells and cell debris. To increase the product concentration and to reduce the volume of material to be handled in the consecutive downstream processing steps, concentration, for example by ultrafiltration, may also be carried out as part of the product isolation.

After product isolation in the isolation unit 3, product purification is performed in a purification unit 4. Product purification may be carried out by different means, including multi-column chromatography, as depicted in FIG. 1 by a chromatography arrangement 5. The chromatography arrangement 5 may comprise a plurality of chromatography columns 6-13 as shown in FIG. 1. In various embodiments, the number of chromatography columns 6-13 connected to the valve switching system 1 is between one and eight.

Compared to traditional single column chromatography, multi-column chromatography significantly increases the efficiency of the purification step. However, especially concerning the fluid flow, multi-column chromatography is more complex than single column chromatography. Therefore, advanced control of the fluid flow path is necessary, which presently is achieved by using a proposed valve switching system as shown in FIG. 1.

After purification, polishing of the product can be performed in a polishing unit 14. At the end of product polishing, the product is typically packaged for further distribution. Depending on the bioprocess, the product polishing may for example include a virus inactivation step to comply with regulatory requirements. Another example for product polishing is a crystallisation step to convert the fluid product into a solid, and thereby easily transportable, form. Yet another example for polishing is the use of chromatography, such as ion-exchange chromatography or hydrophobic interaction chromatography.

The valve switching system 1 comprises a valve switching cassette 15, and an actuator block 16, wherein the valve switching cassette 1 comprises a cassette manifold 17 with at least one fluid flow system 18, 19 of ports and fluid lines. A first fluid flow system 18 includes primary ports $P_p$, communicating with primary fluid lines $L_p$, and secondary ports $P_s$, communicating with secondary fluid lines $L_s$. A second fluid flow system 19 includes primary ports $p_p$, communicating with primary fluid lines $l_p$, and secondary ports $p_s$, communicating with secondary fluid lines $l_s$.

The general functionality of the two fluid flow systems 18, 19 of ports and fluid lines is identical, such that explanations given for one fluid flow system 18, 19 are equally applicable for the respective other fluid flow system 18, 19. In the following, reference is made mainly to the second fluid flow system 19, in order to keep complexity down.

The valve switching cassette 15 also comprises an array of switchable valve units $n_{x,y}$, for selectively interconnecting the primary fluid lines $L_p$, $l_p$ with the secondary fluid lines $L_s$, $l_s$ via transfer fluid lines T.

The expression "port" represents the interface for interconnecting components of the bioprocess installation 2 to the respective fluid line. It may include a fluid connector to the respective fluid line.

The expression "line" represents any longitudinal volume, that may hold and guide fluid between two locations. The fluid lines $L_p$, $l_p$, $L_s$, $l_s$, T are drilled or otherwise machined into the cassette manifold 17, such as by deep hole drilling or the like.

The expressions "primary" and "secondary" are used to differentiate between the two groups of fluid ports to be interconnected by the valve units $n_{x,y}$. In the shown embodiment, those expressions also indicate the direction of fluid flow F, which is then directed from the primary fluid port to the secondary fluid port. However, this can be realized the other way around as well. Accordingly, the expressions "primary" and "secondary" neither imply nor exclude a constructional and/or functional difference between the respective ports and fluid lines.

The expression "selectively interconnecting" means, that one or more of the primary fluid lines $l_p$ may be selected to be interconnected with one or more of the secondary fluid lines $l_s$.

The expression "switchable" refers to the possibility of changing the valve unit $n_{x,y}$ from the state "valve open" to the state "valve closed" or from the state "valve closed" to the state "valve open". If the valve unit $n_{x,y}$ is in the state "valve open", as is exemplarily depicted in the inlay in FIG. 1, fluid may flow from a primary fluid line $l_p$ via transfer fluid lines T into a secondary fluid line $l_s$. In various embodiments, each of the transfer lines T is communicating with a primary fluid line $l_p$ or a secondary fluid line $l_s$. The open valve units $n_{x,y}$ are indicated as solid ovals in FIG. 1 and FIG. 4. If the valve unit $n_{x,y}$ is in the state "valve close", fluid flow from the primary fluid line $l_p$ via the transfer fluid lines T into the secondary fluid line $l_s$ is prevented. The closed valve units are indicated as outlined ovals in FIG. 1 and FIG. 4.

The primary fluid lines $l_p$ and the secondary fluid lines $l_s$ can be arranged in rows and columns within the valve switching cassette 15, wherein the valve units $n_{x,y}$ are located at each junction between a primary fluid line $l_p$ and a secondary fluid line $l_s$, such that the respective fluid lines $l_p$, $l_s$ may be interconnected by the respective valve unit $n_{x,y}$ and the respective transfer fluid lines T. Accordingly, the array of valve units $n_{x,y}$ is aligned to those rows and columns and numbered accordingly. Exemplarily, the valve unit $n_{11,3}$ is shown in detail in the inlay in FIG. 1.

Figure 3:
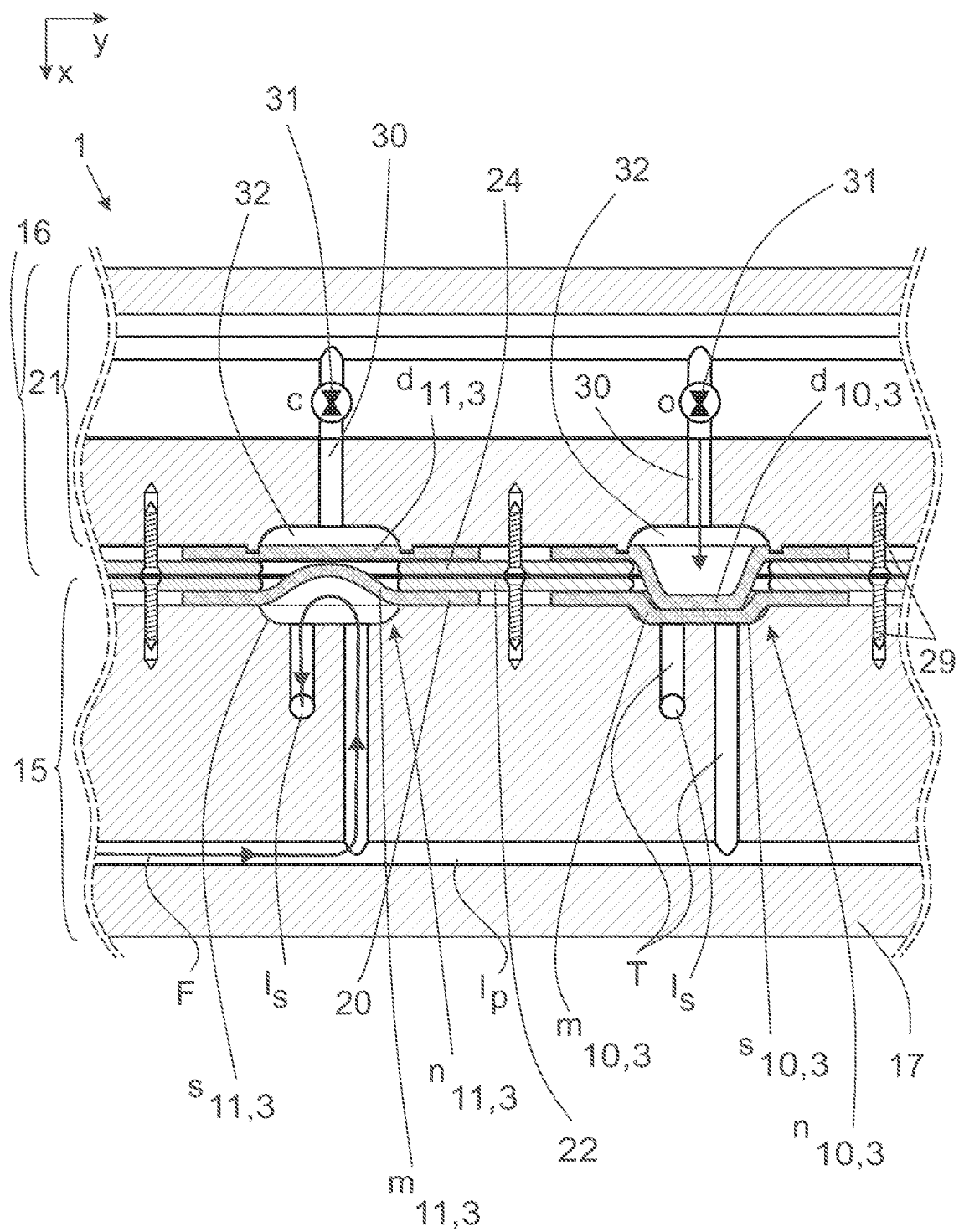

The valve units $n_{x,y}$ each comprise a valve seat $s_{x,y}$. As shown in FIG. 3, for each valve unit $n_{x,y}$, one of the transfer fluid lines T communicating with a primary fluid line $l_p$ and one of the transfer fluid lines T communicating with a secondary fluid line $l_s$ can lead into the valve seat $s_{x,y}$.

In various embodiments, the primary fluid line $l_p$ directly leads into the valve seat $s_{x,y}$ while the secondary fluid line $l_s$ is connected to the valve seat $s_{x,y}$ by a transfer fluid line T.

For controlling the fluid flow, the valve switching cassette 15 of the valve switching system 1 comprises a valve membrane structure 20. The valve membrane structure 20 may sealingly engage the valve seats $s_{x,y}$ of the valve units $n_{x,y}$ as to switch the valve units $n_{x,y}$. The valve membrane structure 20 may selectively engage the valve seat $s_{x,y}$ (state "valve closed") or disengage the valve seat $s_{x,y}$ (state "valve open").

The actuator block 16 further comprises an actuator block body 21 with an actuator for each valve unit $n_{x,y}$ of the valve switching cassette 15. The actuator block 16 may act on the valve membrane structure 20, in particular the valve membrane $m_{x,y}$, by actuating the drive membrane $d_{x,y}$ as will be explained in detail below. In various embodiments, this results in the valve membrane structure 20 to engage the valve seat $s_{x,y}$. When the actuator block 16 does not actuate the drive membrane $d_{x,y}$, as will also be explained in detail below, the valve membrane structure 20 can disengage the valve seat $s_{x,y}$.

In various embodiments, the proposed valve switching system 1 serves for controlling the fluid flow of a component to be selectively interconnected such as the shown chromatography arrangement 5. The fluids which flow is controlled by the valve switching system 1 are referred to as process fluids. Process fluids to be handled within the present disclosure can include a wide variety of liquid media such as buffers, wash solutions, acids, bases, culture media, unprocessed product-containing liquids, partly processed product-containing liquids, purified product-containing liquids, sanitation solutions etc. Fluids to be handled within the present disclosure may also be media in the gas phase.

In various embodiments, the valve switching cassette 1 comprises a perforated backer plate 22 securing the valve membrane structure 20 to the cassette manifold 17, wherein the actuator block 16 comprises a drive membrane structure 23 and a perforated backer plate 24 securing the drive membrane structure 23 to the actuator block body 21.

The perforations of both backer plates 22, 24 each include a pattern of perforation holes 25, 26, wherein the perforations of both backer plates 22, 24 are at least partly aligned to each other, such that for selectively switching the valve units $n_{x,y}$, an actuator of the actuator block 16 may urge the drive membrane structure 23 through aligned perforation holes 25, 26 of both backer plates 22, 24 into engagement with the valve membrane structure 20. This is shown on the right side of FIG. 3.

The expression "perforated" is to be understood as a pattern of perforation holes 25, 26 in the respective backer plate 22, 24, extending through the complete thickness of the respective backer plate 22, 24.

It now has been found that utilizing a drive membrane structure 23 significantly improves the operational reliability of the valve switching system 1, as will be explained now.

The pressure required during installation and operation of the valve switching system 1 can be significantly reduced, if the backer plate 24 is used to securely fasten the drive membrane structure 23 to the actuator block body 21. By using the backer plate 24 to fasten the drive membrane structure 23, the gas- or liquid-tight connection between the drive membrane structure 23 and the actuator block body 21 is achieved with less forces required. Additionally, the use of the backer plate 24 enables the preassembly of the actuator block 16.

Further, as the gas- or liquid-tight connection of the actuator block body 21 is now realized between the actuator block body 21 and the drive membrane structure 23, the valve membrane structure 20 only needs to be sealed fluid-tightly against the cassette manifold 17 and not, as previously necessary, also gas- or liquid-tightly against the actuator block body 21.

If less pressure is required during installation and operation of the valve switching system 1, the pressure exerted on the valve membrane structure 20 and the cassette manifold 17 is reduced. Accordingly, the thickness of both, the valve membrane structure 20 and the cassette manifold 17, can be reduced, which reduces the overall material costs. The reduced thickness particularly of the valve membrane structure 20 contributes to an increased sensitivity and accuracy regarding the actuation of the valve units. Further, the lower required pressure also reduces the costs of the actuator block body 21 since it no longer needs to handle the relatively high pressures and the associated high forces.

By using a backer plate 22 to fasten the valve membrane structure 20 to the cassette manifold 17, the valve switching cassette 15 can be preassembled as well. Here, the backer plate 22 is also used to establish the fluid-tight connection between the cassette manifold 17 and the valve membrane structure 20.

The drive membrane structure 23 may be urged by an actuator such that it protrudes through any one of aligned perforation holes 25, 26 in the backer plates 22, 24, thereby engaging the valve membrane structure 20 to switch the respective valve unit $n_{x,y}$. As will be explained later, different principles are envisaged for actuation.

The installation process of the valve switching system 1 is further simplified, since the valve switching cassette 15 and the actuator block 16 can be checked for liquid- and/or gas-tightness before installation.

Figure 2:
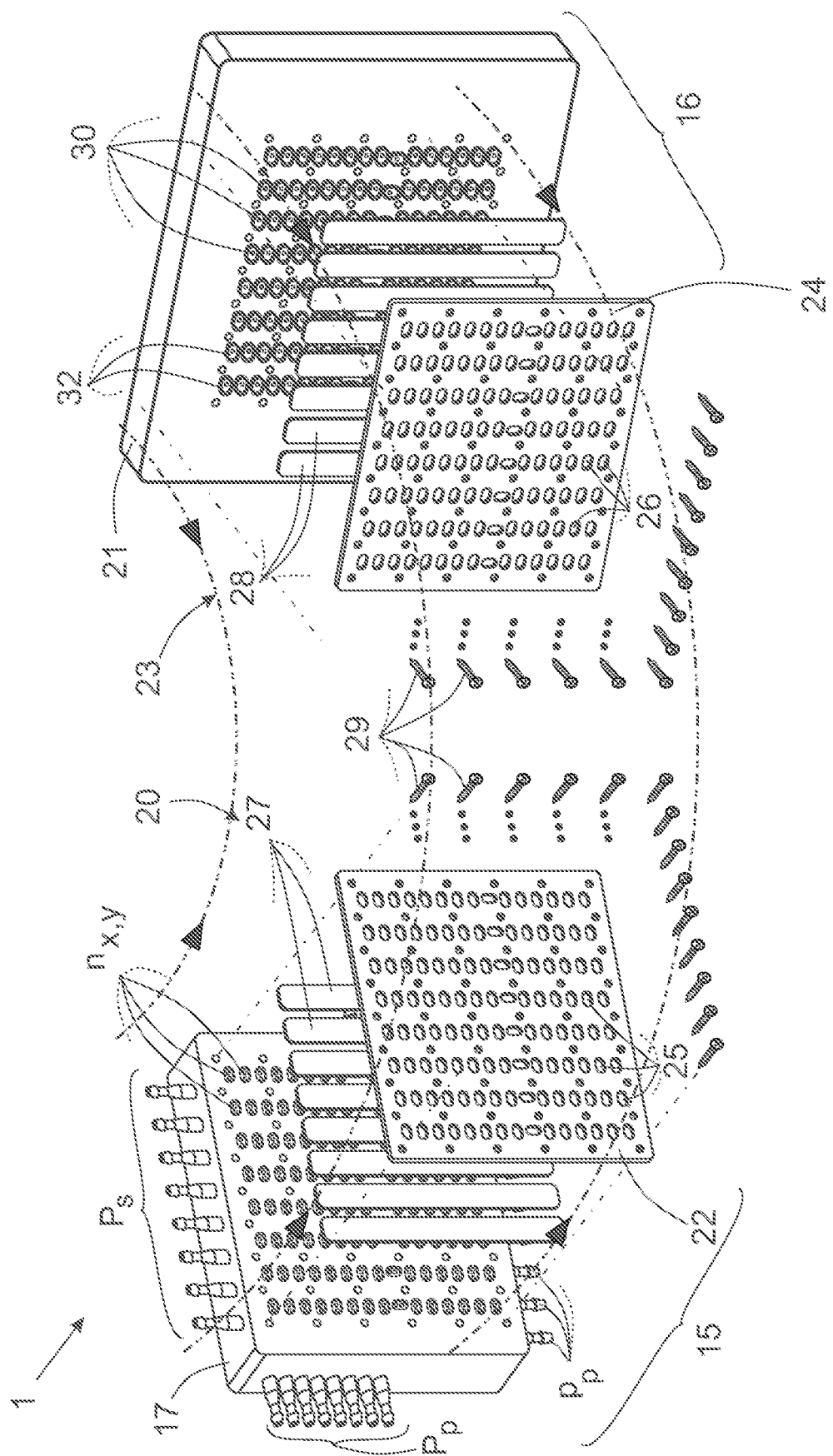

The backer plates 22, 24, which are depicted in FIG. 2, might be composed of different materials. In various embodiments, both backer plates 22, 24 are composed of the same material, in some embodiments, both backer plates 22, 24 are composed of acrylic plastic. However, also other, for example more durable materials like aluminium, can be used. Additionally, other types of plastic material, e.g., PMMA, PEEK or PVDF might also be used. It can further be that the backer plates 22, 24 are identical in terms of their geometry. A similar design of the backer plates 22, 24 regarding geometry and/or material may be advantageous in terms of manufacturing.

Alternatively, by using one backer plate 22 for the valve switching cassette 15 and one backer plate 24 for the actuator block 16, different materials for each backer plate 22, 24 can be used. For example, a disposable plastic material could be used for the backer plate 22 of the valve switching cassette 15, while a reusable material (e.g., aluminium) may be used for the backer plate 24 of the actuator block 16. The geometries of the backer plates 22, 24 may alternatively also differ in their geometry.

It should be pointed out that the realization of the backer plates 22, 24 is very simple. The perforation holes 25, 26 might be introduced into the backer plates 22, 24 by drilling, punching, injection molding or the like.

As shown in FIG. 3, when the drive membrane $d_{x,y}$ is urged by an actuator of the actuator block 16, the drive membrane $d_{x,y}$ protrudes through the respective perforation hole 26 in the backer plate 24 of the actuator block 16 and through the aligned perforation hole 25 in the backer plate 22 of the valve switching cassette 15. The drive membrane $d_{x,y}$ then acts on the valve membrane $m_{x,y}$ to switch the valve unit $n_{x,y}$, as will be explained later. Here, the drive membrane $d_{x,y}$ not only provides the gas- or liquid-tight sealing between the drive membrane $d_{x,y}$ and the actuator block pocket 26, but, since the drive membrane $d_{x,y}$ provides an additional resistance for the flexing of the valve membrane $m_{x,y}$, mechanical wear of the valve membrane $m_{x,y}$ is reduced, which enhances the proper functioning of the valve unit $n_{x,y}$.

As shown in FIG. 2, the valve switching cassette 15 and the actuator block 16 are joined together via the respective backer plates 22, 24. As already explained, this enables a preassembly of the valve switching cassette 15 and the actuator block 16 and consequently enhances proper installation of the valve switching system 1. Further aspects related to the manufacturing process of the valve switching system 1 will be explained below.

Joining the backer plates 22, 24 of the preassembled valve switching cassette 15 and the preassembled actuator block 16 together, as indicated by the arrows in FIG. 2, might be conducted in a number of ways. It should be pointed out, that the connection might be permanently, but can be realized non-permanently, meaning that the connection can be terminated in a non-destructive way. For example, the backer plates 22, 24 might be connected using screws or clamps, which can be removed after the process is finished. Alternatively, an adhesive might be used to connect the backer plates 22, 24. However, the mentioned options are only examples, other options, which allow a connection of the backer plates 22, 24, might also be envisaged.

As can be seen from FIG. 2, at least part of the perforation holes 25, 26 of the backer plates 22, 24 are aligned to the valve seats $s_{x,y}$ of the valve units $n_{x,y}$.

In various embodiments, the perforation holes 25, 26 are arranged in rows and columns. It can be that the perforation holes 25, 26 are arranged in such a way that each column comprises a number of perforation holes 25, 26 that is equal to the number of valve units $n_{x,y}$ in the respective column. In various embodiments, the number of perforation holes 25, 26 in each row corresponds to the number of valve units $n_{x,y}$ in the respective row. In a depicted embodiment, each row comprises eight perforation holes 25, 26.

In various embodiments, the number of perforation holes 25, 26 in each backer plate 22, 24 is equal to the number of valve units $n_{x,y}$. It can also be that each perforation hole 25, 26 in each backer plate 22, 24 is assigned to exactly one valve unit $n_{x,y}$. By aligning the perforation holes 25, 26 of the backer plates 22, 24 to the valve seats $s_{x,y}$, the protrusion of the drive membrane $d_{x,y}$ is defined by the shape of the perforation holes 25, 26. This ensures that only the respective valve unit $n_{x,y}$ is actuated as each membrane structure 20, 23 is kept in its position by the respective backer plate 22, 24.

In various embodiments, the shape of each of the perforation holes 25, 26 corresponds to the geometry of the assigned valve seat $s_{x,y}$. In various embodiments, the perforation holes 25, 26 have an oval geometry. This enhances the defined protrusion of the membranes $m_{x,y}$, $d_{x,y}$, especially, if actuation is performed indirectly, for example by air pressure, as the protrusion of the membranes $m_{x,y}$, $d_{x,y}$ is then guided by the shape of the perforation holes 25, 26. Additionally, by choosing an oval geometry, sharp corners and edges, which might compromise the structural integrity of the valve membrane $m_{x,y}$ and/or the drive membrane $d_{x,y}$, are avoided.

At least one valve membrane $m_{x,y}$ of the valve membrane structure 20 can be composed of a fluorocarbon-based fluoroelastomer (FKM), which is a rubber compound that uses vinylidene fluoride as its monomer (e.g., Viton®). As noted above, FKM is robust even when in contact with fluids that tend to attack the material like acids and bases.

The hardness (Shore A) of the valve membrane $m_{x,y}$ can be between 50 and 80, such as at 75. The material thickness of the valve membrane $m_{x,y}$ can be less than 1 mm, or between 0.5 mm and 0.75 mm.

The valve membrane structure 20 and the drive membrane structure 23 may be of identical layout in view of material and/or geometry, in particular thickness which is logistically advantageous. However, it can be that, due to cost optimization and the different functions of the respective membrane structures 20, 23, which will be explained in detail below, that different materials are chosen for the membrane structures 20, 23.

In various embodiments, at least one drive membrane $d_{x,y}$ of the drive membrane structure 23 is composed of a soft flexible plastic material. It may be pointed out that the material of the drive membrane $d_{x,y}$ needs to be flexible and resistant against abrasion. Further, it needs to be durable. Suitable materials can for example be chosen according to their air-sealing capabilities. In various embodiments, the drive membrane $d_{x,y}$ is composed of a thermoplastic elastomer (TPE). In various embodiments, the drive membrane $d_{x,y}$ is either composed of polychloroprene (also known as neoprene), a thermoplastic polyester (e.g., Hytrel®) or a thermoplastic vulcanizate (e.g., Santroprene™). However, the material of the drive membrane $d_{x,y}$ is not limited to the materials listed above, but might be composed of any other material that complies with the requirements stated above and below.

In various embodiments, the hardness (Shore A) of the drive membrane $d_{x,y}$ lies between 40 and 70, such as at 55. The material thickness of the drive membrane $d_{x,y}$ can be less than 2 mm, or between 1.25 and 1.75 mm.

Depending on the process carried out with the valve switching system 1, different requirements might need to be fulfilled by the valve membrane structure 20 and the drive membrane structure 23, respectively. For example, the valve membrane $m_{x,y}$ of the valve membrane structure 20 might need to comply with a certain certification ("USP class") based on the general Chapter 88 of the United States Pharmacopeia and National Formulary (USP-NF). In one embodiment, the material of the valve membrane $m_{x,y}$ complies with the regulations set out for USP class VI certification. However, this requirement does not necessarily have to be fulfilled by the drive membrane $d_{x,y}$, as the drive membrane $d_{x,y}$ is out of contact with the process fluids distributed within the cassette manifold 17. This enables a broader choice of materials for the drive membrane $d_{x,y}$.

A particular advantage of utilizing membrane materials for the valve membrane $m_{x,y}$ and the drive membrane $d_{x,y}$ that may differ in thickness, properties, and materials is, that each of the membranes $d_{x,y}$, $m_{x,y}$ can be tailored to suit its respective purpose best. This means that for example the thickness of the valve membrane $m_{x,y}$ can be chosen and optimized for optimum switching of the valve units $n_{x,y}$ while the drive membrane $d_{x,y}$ can be chosen to provide optimum air-sealing capabilities. This adds flexibility in operation and contributes to an increased process reliability as the operational lifetime of both membranes may be enhanced.

The fluid-tight sealing between the cassette manifold 17 and the valve membrane structure 20 and the gas- or liquid-tight sealing between the drive membrane structure 23 and the actuator block body 21 are ensured as the backer plates 22, 24 are firmly pressed against the cassette manifold 17 and the actuator block body 21, respectively.

In detail, the valve units $n_{x,y}$ are designed as membrane valve units, each with a valve membrane $m_{x,y}$, which may be moved between an open (FIG. 3, valve unit $n_{11,3}$) and a closed position (FIG. 3, valve unit $n_{10,3}$).

The valve units $n_{x,y}$ each comprise a valve seat $s_{x,y}$, wherein the respective valve membrane $m_{x,y}$, provided by the valve membrane structure 20, may selectively engage the valve seat $s_{x,y}$ (state "valve closed") or disengage the valve seat $s_{x,y}$ (state "valve open") as to switch the valve units $n_{x,y}$. As shown in FIG. 3, for each valve unit $n_{x,y}$, one of the fluid lines $l_p$, $l_s$ leads into a transfer fluid line T. In various embodiments, the transfer fluid lines T lead into the valve seat $s_{x,y}$. The valve seat $s_{x,y}$ may sealingly interact with the valve membrane $m_{x,y}$ provided by the valve membrane structure 20.

As will be explained later in detail, the actuation of the valve membrane $m_{x,y}$, is realized through the drive membrane $d_{x,y}$ of the drive membrane structure 23.

As depicted in FIG. 2, the valve membrane structure 20 comprises valve membrane stripes 27. In various embodiments, the number of valve membrane stripes 27 is equal to the number of columns of perforation holes 25, 26 on at least one of the backer plates 22, 24. In various embodiments, each valve membrane stripe 27 covers one column of valve units $n_{x,y}$.

As can also be seen from FIG. 2, the drive membrane structure 23 comprises drive membrane stripes 28. In various embodiments, the number of drive membrane stripes 28 is equal to the number of columns of perforation holes 25, 26 on at least one of the backer plates 22, 24. In various embodiments, each drive membrane stripe 28 covers one column of valve units $n_{x,y}$.

It can be that the number and shape of the valve membrane stripes 27 are identical to the number and shape of the drive membrane stripes 28. In addition, it can be that the valve membrane stripes 27 and the drive membrane stripes 28 are aligned. In various embodiments, the membrane stripes 27, 28 have a certain cross-sectional form, such as an arcuate, polygonal, in particular rectangular form.

As depicted in FIG. 2, the space between each of the membrane stripes 27, 28 is identical. In various embodiments, fixture elements 29 for connecting the respective backer plate 22, 24 to the cassette manifold 17 or the actuator block body 21, respectively, are inserted between the membrane stripes 27, 28 in such a way that the membrane stripes 27, 28 are not in direct contact with the fixture elements 29, but fastened indirectly by compression forces.

The number and arrangement of the membrane stripes 27, 28 is only exemplarily and not limited to the description given above. Depending on the design of the valve units $n_{x,y}$, different configurations might be chosen. For example, the valve membrane $m_{x,y}$ and/or the drive membrane $d_{x,y}$ might comprise only one membrane stripe that covers all valve units $n_{x,y}$, or each stripe covers several rows and/or columns of valve units $n_{x,y}$.

The valve membrane structure 20 is attached to the cassette manifold 17 by a backer plate 22 (FIG. 2). In various embodiments, the backer plate 22 is in constant force fit connection with the valve membrane structure 20, pressing the valve membrane structure 20 to the cassette manifold 17. Here it is also essential, that the valve membrane $m_{x,y}$ is sealingly connected to the cassette manifold 17 in order to establish a fluid-tight and leak-free connection between the valve seat $s_{x,y}$ and the valve membrane $m_{x,y}$. In various embodiments, the backer plate 22 is connected to the cassette manifold 17 using fixture elements 29 such as screws. It can be that the fixture elements 29 are arranged in rows and columns. In various embodiments, the backer plate 22 comprises openings for the insertion of the fixture elements 29.

For proper positioning of the at least one valve membrane stripe 27, the backer plate 22 may comprise corresponding grooves (not depicted) on the flat side of the backer plate 22 that faces the cassette manifold 17. These grooves can have the same shape as the membrane stripes 27 so that each membrane stripe 27 may be inserted into one groove. This contributes to a simplified preassembly of the valve switching cassette 15.

The drive membrane structure 23 is attached to the actuator block body 21 by a backer plate 24 (FIG. 2). In various embodiments, the backer plate 24 is in constant force fit connection with the drive membrane structure 23, pressing the drive membrane structure 23 to the actuator block body 21. Here it is also essential, that the drive membrane structure 23 is sealingly connected to the actuator block body 21 to establish a gas- or liquid-tight connection between the actuator block body 21 and the drive membrane structure 23. In various embodiments, the backer plate 24 is connected to the actuator block body 21 using fixture elements 29 such as screws. It can be that the fixture elements 29 are arranged in rows and columns. In various embodiments, the backer plate 24 comprises openings for the insertion of the fixture elements 29.

For proper positioning of the at least one drive membrane stripe 28, the backer plate 24 may comprise corresponding grooves (not depicted) on the flat side of the backer plate 24 that faces the actuator block body 21. These grooves can have the same shape as the membrane stripes 28 so that each membrane stripe 28 may be inserted into one groove. This contributes to a simplified preassembly of the actuator block 16.

The backer plate 22 assigned to the valve switching cassette 15 provides a detachable, fluid tight connection between the valve membrane structure 20 and the cassette manifold 17, as shown in FIG. 2. Accordingly, no adhesive is necessary to connect the valve membrane structure 20 to the backer plate 22 and to the cassette manifold 17, which makes it generally possible to exchange the valve membrane structure 20 and/or dispose the valve membrane structure 20 separately from the backer plate 22 and the cassette manifold 17.

The backer plate 24 assigned to the actuator block 16 also provides a detachable, gas- or liquid-tight connection between the drive membrane structure 23 and the actuator block body 21, as shown in FIG. 2. Accordingly, no adhesive is necessary to connect the drive membrane structure 23 to the backer plate 24 and to the actuator block body 21, which makes it generally possible to exchange the drive membrane structure 23 and/or dispose the drive membrane structure 23 separately from the backer plate 24.

It should be noted that the use of screws as fixture elements 29 is only one example for connecting the backer plates 22, 24 to the cassette manifold 17 and/or the actuator block body 21, respectively. The use of other fixture elements, e.g., clamps, is imaginable as well.

As explained above, the backer plates 22, 24 enable the preassembly of the valve switching cassette 15 and the actuator block 16, respectively and guide the protrusion of the membrane structures 20, 23.

Here, the backer plates 22, 24 are shown to serve the additional function of securely fastening the membrane structures 20, 23 and providing the required gas- and/or liquid-tight connection for the correct functioning of the valve switching system 1. By this multi-functionality of the backer plates 22, 24, the overall design of the valve switching system 1 is simplified.

As shown in FIG. 3, the actuator block 16 comprises an actuator (not shown) with an actuation outlet 30. Through the actuation outlet 30, pressure is applied on the drive membrane structure 23. In various embodiments, the actuation outlet 30 is a gas pressure outlet or a liquid pressure outlet. In various embodiments, one actuation outlet 30 is assigned to each valve unit $n_{x,y}$. The actuation of the drive membrane structure $d_{x,y}$ can be carried out in a contact free manner, in particular pneumatically or hydraulically by applying a gas or liquid onto the drive membrane structure 23 via the actuation outlet 30. In various embodiments, compressed air is used for actuation. In this case, the construction of the actuator block 16 is simplified, as no mechanical actuators (e.g., plungers) are needed. Further, as the pressure is evenly applied on the membranes $m_{x,y}$, $d_{x,y}$, mechanical wear on the membranes $m_{x,y}$, $d_{x,y}$ is reduced.

However, a plunger or any other system suitable for direct actuation of the drive membrane $d_{x,y}$ could also be used to actuate the drive membrane $d_{x,y}$ in a direct manner. In this case, the plunger would be actuated, for example pneumatically, hydraulically, electro-magnetically or the like. Even though no gas- or liquid-tightness between the actuator block body 21 and the drive membrane $d_{x,y}$ would be required, if the drive membrane $d_{x,y}$ was directly actuated by a plunger or the like, other advantages of the proposed valve switching system 1, especially the option for preassembly, would still be applicable.

The pressure applied on the drive membrane $d_{x,y}$ through the actuation outlet 30 might be controlled in several ways as will be explained below.

By applying liquid or gas pressure via the actuation outlet 30 onto the drive membrane $d_{x,y}$ or by directly actuating the drive membrane $d_{x,y}$, the drive membrane $d_{x,y}$ protrudes through the perforation holes 25, 26 in the backer plates 22, 24 and flexes against the valve membrane structure 20 (FIG. 3). In particular, the valve membrane $m_{x,y}$ is actuated, which results in the valve membrane structure 20 coming into sealing engagement with the valve seat $s_{x,y}$. In FIG. 3, this is exemplarily depicted for the valve unit $n_{10,3}$. If the pressure is removed or the plunger is retracted, the pressure of the process fluids distributed inside the cassette manifold 17 causes the valve membrane structure 20, in particular the valve membrane $m_{x,y}$, to flex against the drive membrane $d_{x,y}$ (FIG. 3). This flexing results in the valve membrane $m_{x,y}$ coming out of sealing engagement with the valve seat $s_{x,y}$. In FIG. 3, this is depicted for the valve unit $n_{11,3}$.

It may be pointed out, that the expression "coming into sealing engagement" represents establishing a fluid tight sealing, normally force fit engagement between the valve membrane structure 20 and the valve seat $s_{x,y}$, while the expression "coming out of sealing engagement" may include a loose contact between the valve membrane structure 20 and the valve seat $s_{x,y}$, which however is not fluid-tight.

As depicted in FIG. 3, a control valve 31 could be used to control the pressure in the actuation outlet 30. If the control valve 31 is opened (indicated by the letter "o" in FIG. 3), and the pressure introduced into the actuator block pocket 32 through the actuation outlet 30 is larger than the pressure exerted on the valve membrane structure 20 by the process fluid flow F, the drive membrane $d_{x,y}$ is actuated, as explained above. If the control valve 31 is closed (indicated by the letter "c" in FIG. 3), the current pressure is maintained within the actuator block pocket 32. Depending on the pressure difference between the pressure exerted by the process fluid flow F and the pressure in the actuator block pocket 32, the flexing of the valve membrane $m_{x,y}$ and the drive membrane $d_{x,y}$ can be controlled in a precise manner. As mentioned above, the thickness of the valve membrane $m_{x,y}$ may well be reduced. This further contributes to the precise controllability, as the valve membrane $m_{x,y}$ will be more sensitive towards exerted pressures, and may for example be actuated at lower pressures exerted by the process fluid flow F.

Depending on the elasticity difference between the materials of the membrane structures 20, 23, each of the membrane structures 20, 23 may restrict the deformation of the respective other membrane structure 20, 23. This especially means, that the flexing of the valve membrane structure 20 may be restricted by the drive membrane structure 23 when the valve membrane structure 20 comes out of sealing engagement with the valve seat $s_{x,y}$. This results in a defined flexing of the valve membrane structure 20. By this, particularly the design of the backer plate 22 of the valve switching cassette 15 is simplified, as no recesses are required to limit the protrusion of the valve membrane structure 20. Additionally, this enables the use of a flexible material for the valve membrane structure 20 for a reliable actuation of the valve units $n_{x,y}$ while the risk of mechanical wear out of the valve membrane structure 20 is reduced.

The actuator block 16 may be controlled by an electronic control (not shown), including a microprocessor, operated based on a control software. Here it becomes apparent that the complete process fluid flow F can be flexibly and precisely controlled electronically just by a corresponding modification of the control software.

Manufacturing of the valve switching system 1 is simplified since the valve switching cassette 15 and the actuator block 16 can be preassembled individually. This also means that, for example, sterilization (e.g., by gamma-irradiation) can be carried out on the valve switching cassette 15 and the actuator block 16 separately or only on the valve switching cassette 15. The latter can be as sterilization of the actuator block 16 may not be required as the actuator block 16 does not come into contact with the process fluids. Further, both parts can be checked for liquid- and/or gas-tightness before installation.

This enables corrective actions and, if necessary, readjusting the membrane structures 20, 23 or backer plates 22, 24 prior to assembly. This way, leakage issues due to improper installation are reduced. This greatly improves the installation procedure and significantly reduces the potential of operational failure.

Since both parts, namely the valve switching cassette 15 and the actuator block 16, are preassembled and may be checked for liquid- and/or gas-tightness prior to installation, the preassembled parts can be joined together via the respective flat faces of the backer plates 22, 24 in a more flexible way, because slightly different positioning of the valve switching cassette 15 and the actuator block 16 does not affect liquid- and/or gas-tightness. Further, the actuator block 16 (or parts of it) could easily be reused, while the valve switching cassette 15 (or parts of it) is disposed after the process is finished. Additionally, the valve switching cassette 15 could be sterilized after assembly and then distributed in a sterile form. As explained above, joining of the preassembled valve switching cassette 15 and the preassembled actuator block 16 might be carried out in a number of ways.

According to various embodiments, the bioprocess installation 2 is provided. Reference is made to all explanations given regarding the first teaching.

According to various embodiments, the bioprocess installation 2 comprises the component to be selectively interconnected, which here is the chromatography arrangement 5 with its multiple chromatography columns 6-13, that are connected to the valve switching system 1 for performing a simulated moving bed (SMB) chromatography process for example. Reference is made to all explanations given regarding the previous teachings.

Figure 4:
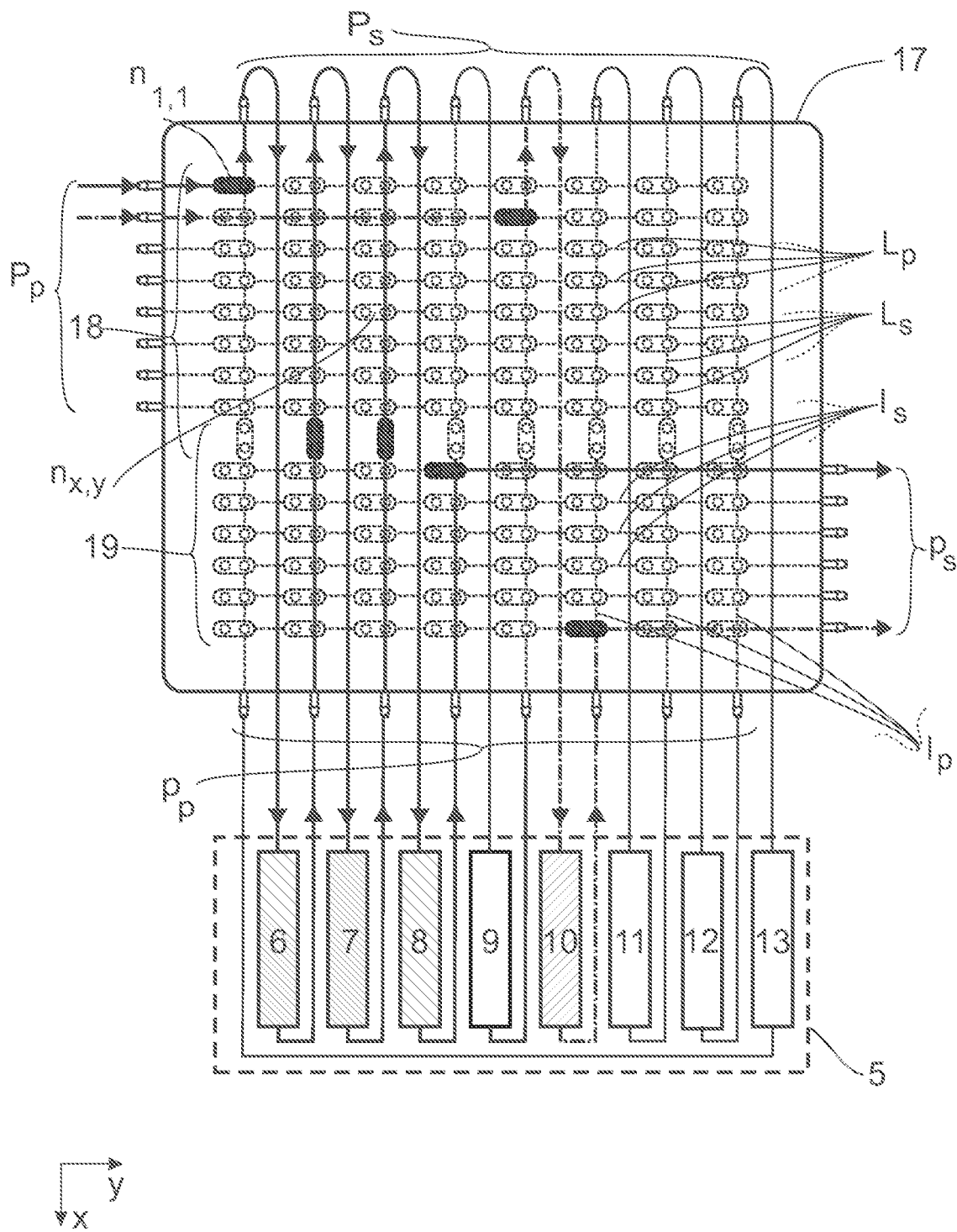

FIG. 4 shows just another exemplary operation of the proposed valve switching system 1. Here it becomes clear, that numerous variants of sequential and parallel utilization of the chromatography columns 6-13 are possible. While the chromatography columns 6, 7, 8 are utilized in sequence, the chromatography column 10 is utilized in parallel thereto. All in all, the process fluid flow can be directed from any one of the inlets provided by primary ports $P_p$ of the first fluid flow system 18 to any one of the outlets provided by the secondary fluid ports $p_s$ of the second fluid flow system 19, utilizing any number of chromatography columns in any desired sequential or parallel manner. By reducing the fluid flow pressure within the cassette manifold 17, as explained above, the fluid flow pressure in the connected chromatography columns 6-13 may also be reduced.

Various embodiments are directed to a method for operating a valve switching system 1 and the use of the valve switching system 1. For operation of the above noted valve switching system 1 it is essential, that the drive membrane structure 23 is selectively urged by the actuator through any one of the perforation holes 25, 26 in the backer plates 22, 24. Reference is made to all explanations given before.

Finally, it may be pointed out, that the valve switching system 1 according to the various teachings may be subject to scale-up or scale-down to different levels of process scales without having to introduce structural modifications.

The proposed solution is particularly advantageous in a bioprocess installation 2 related to a chromatography arrangement with multiple chromatography columns for performing simulated moving bed (SMB) chromatography.

As the valve switching system 1 comprises two backer plates 22, 24 and two membrane structures 20, 23, preassembly of the valve switching cassette 15 and the actuator block 16 including the respective membrane structures 20, 23 is possible. This improves the applicability during process assembly and reduces the costs during installation. Further, since the backer plates 22, 24 are used to sealingly connect the respective membrane structures 20, 23 to the cassette manifold 17 and the actuator block body 21, respectively, the gas- and/or liquid-tight sealing of the valve unit $n_{x,y}$ and the reliable actuation of the valve membrane $m_{x,y}$ to switch the valve unit $n_{x,y}$ is ensured. Additionally, the pressure required for gas- or liquid-tight sealing is reduced and less pressure is exerted on the cassette manifold 17. Less pressure required reduces the operational costs and increases the process reliability, as high-cost pressurizing mechanisms are abolished and damage to the cassette manifold 17 is prevented. Additionally, the thickness of the cassette manifold 17 and the valve membrane structure 20 can be reduced, if less pressure is applied. In conclusion, the proposed design of the valve switching system 1 improves the currently known design in several ways.

The invention claimed is:

1. A valve switching system for selectively interconnecting components of a bioprocess installation, comprising a valve switching cassette and an actuator block, wherein the valve switching cassette comprises a cassette manifold with at least one fluid flow system of ports and fluid lines, which includes primary ports, communicating with primary fluid lines, and secondary ports, communicating with secondary fluid lines, wherein the valve switching cassette comprises an array of switchable valve units for selectively interconnecting the primary fluid lines with the secondary fluid lines via transfer fluid lines, wherein the valve units each comprise a valve seat, wherein the valve switching cassette comprises a valve membrane structure with at least one valve membrane, that can selectively engage the valve seats as to switch the valve units, wherein the actuator block comprises an actuator block body with an actuator for each valve unit, wherein that the valve switching cassette comprises a perforated backer plate securing the valve membrane structure to the cassette manifold, that the actuator block comprises a drive membrane structure with at least one drive membrane and a perforated backer plate securing the drive membrane structure to the actuator block body, wherein the perforations of both backer plates each include a pattern of perforation holes, wherein the perforations of both backer plates are at least partly aligned to each other, such that for selectively switching the valve units, an actuator of the actuator block can urge the drive membrane structure through aligned perforation holes of both backer plates into engagement with the valve membrane structure.

2. The valve switching system according to claim 1, wherein the drive membrane, when urged by an actuator of the actuator block, protrudes through the respective perforation hole in the backer plate of the actuator block and through the aligned perforation hole in the backer plate of the valve switching cassette.

3. The valve switching system according to claim 1, wherein the valve switching cassette and the actuator block are joined together via the respective backer plates.

4. The valve switching system according to claim 1, wherein at least part of the perforation holes of the backer plate of the valve switching cassette and/or at least part of the perforation holes of the backer plate of the actuator block are aligned to the valve seats of the valve units.

5. The valve switching system according to claim 1, wherein at least one valve membrane of the valve membrane structure is composed of fluorocarbon-based fluoroelastomer materials.

6. The valve switching system according to claim 1, wherein at least one drive membrane of the drive membrane structure is composed of a plastic material.

7. The valve switching system according to claim 1, wherein the valve membrane structure and/or the drive membrane structure comprise(s) membrane stripes.

8. The valve switching system according to claim 1, wherein the valve membrane is secured to the cassette manifold by the respective backer plate, which backer plate provides a detachable, gas- and/or liquid-tight connection between the valve membrane and the cassette manifold.

9. The valve switching system according to claim 1, wherein the drive membrane is secured to the actuator block body by the respective backer plate, which backer plate provides a detachable, gas- and/or liquid-tight connection between the drive membrane and the actuator block.

10. The valve switching system according to claim 1, wherein the actuator of the actuator block comprises at least one actuation outlet.

11. A method for manufacturing a valve switching system according to claim 1 wherein the valve switching cassette and the actuator block are being joined together via the respective backer plates.

12. A bioprocess installation, comprising a valve switching system according to claim 1.

13. The bioprocess installation according to claim 12, wherein the bioprocess installation comprises a chromatography arrangement with multiple chromatography columns, that are connected to the valve switching system for performing a simulated bed chromatography process.

14. A method for operating a valve switching system according to claim 1, wherein the valve units are being selectively switched by the drive membrane structure being urged by the actuator block through aligned perforation holes of both backer plates, thereby engaging the valve membrane structure to switch the respective valve unit.

15. A method comprising switching chromatography columns of the bioprocess installation according to claim 13.

16. The valve switching system according to claim 1, wherein the actuator of the actuator block comprises a gas pressure outlet or a liquid pressure outlet.

* * * * *